United States Patent
Elmaleh et al.

(10) Patent No.: US 8,306,573 B2
(45) Date of Patent: Nov. 6, 2012

(54) METHOD AND APPARATUS FOR INCREASING CALL CAPACITY ON A CARRIER

(75) Inventors: Aharon Elmaleh, Makabim-Re'ut (IL); Baruh Hason, Tel Aviv-Yaffo (IL); Gabi Ofir, Gush (IL); Salomon Serfaty, Gaash (IL)

(73) Assignee: Motorola Solutions, Inc., Schaumburg, IL (US)

( * ) Notice: Subject to any disclaimer, the term of this patent is extended or adjusted under 35 U.S.C. 154(b) by 155 days.

(21) Appl. No.: 12/960,522

(22) Filed: Dec. 5, 2010

(65) Prior Publication Data

US 2012/0142363 A1    Jun. 7, 2012

(51) Int. Cl.
*H04M 1/00* (2006.01)
(52) U.S. Cl. .............. 455/561; 455/550.1; 455/450; 370/329
(58) Field of Classification Search .......... 455/561, 455/550.1, 450; 370/329
See application file for complete search history.

(56) References Cited

U.S. PATENT DOCUMENTS

| | | | |
|---|---|---|---|
| 2002/0167920 A1* | 11/2002 | Miyazaki et al. | 370/329 |
| 2007/0036121 A1* | 2/2007 | Cherian et al. | 370/342 |
| 2007/0047503 A1* | 3/2007 | Gonorovsky et al. | 370/337 |
| 2009/0163158 A1* | 6/2009 | Chitrapu et al. | 455/127.5 |
| 2009/0207815 A1* | 8/2009 | Parkvall et al. | 370/336 |
| 2011/0069669 A1* | 3/2011 | Dwyer et al. | 370/329 |
| 2012/0020304 A1* | 1/2012 | Hole et al. | 370/329 |

* cited by examiner

*Primary Examiner* — Danh Le
(74) *Attorney, Agent, or Firm* — Anthony P. Curtis; Daniel R. Bestor

(57) ABSTRACT

A method and apparatus is disclosed for increasing calling capacity in a carrier using enhanced Terrestrial Trunk Radio (TETRA) protocols. The method includes transmitting, by a base station to at least one mobile station, a permission signal for an assigned timeslot on a carrier, wherein each timeslot is divided into at least two sub-slots. The method also includes configuring a control signal that is associated with each of the plurality of timeslots. Specific fields in the control signal are associated with each sub-slot on each of the plurality of timeslots. The method further includes providing usage markers through the control signal. Usage markers values are divided into ranges, each range used to identify a timeslot or a sub-slot assignment on the carrier. The base station sends a time advance value to the mobile station to indicate when transmission from the mobile station is to begin.

20 Claims, 4 Drawing Sheets

METHOD AND APPARATUS FOR INCREASING CALL CAPACITY ON A CARRIER

FIELD OF THE DISCLOSURE

The present disclosure relates generally to Terrestrial Trunk Radio (TETRA) protocols and more particularly to enhancing TETRA protocols to increase calling capacity.

BACKGROUND

Terrestrial Trunk Radio (TETRA) is a global standard for radio communications on private/professional mobile radios. Any TETRA standards or specifications referred to herein may be obtained by contacting ETSI at ETSI Secretariat, 650, Route des Lucioles, 06921 Sophia-Antipolis Cedex, FRANCE. Professional mobile radios include radios, other than mobile telephones, such as mobile radios, portable radios, and the like. According to existing TETRA protocols, four channels are interleaved into one carrier using Time Division Multiple Access (TDMA) protocol, with a 25 kilohertz (kHz) carrier spacing. Each channel indicates a logical assignment on the carrier and is assigned one physical timeslot. Because four channels are interleaved into one carrier, a frame on the carrier is physically divided four timeslots, one for each channel. Hence, systems implementing existing TETRA protocols can support up to four simultaneous and independent calls on a single carrier.

In TETRA systems, channels are shared resources. A base station in a TETRA system automatically allocates the channels to radios at the beginning of each call. Radios thereafter transmit voice/data traffic or control/signaling streams on the assigned channels. Cost savings are therefore achieved in base stations where only one radio unit is needed for every four user channels. Both point-to-point (direct individual calls) and point-to-multipoint calls (group calls) may be made using TETRA protocols.

Existing TETRA protocols may be enhanced to further increase the carrier capacity. For example, existing TETRA protocols can be enhanced to support more simultaneous and independent calls on a carrier by further dividing physical resources. Existing TETRA protocols can also be enhanced to improve protocol services to support new multiplexing schemes. To support legacy TETRA units (base stations and mobile stations that are using existing TETRA protocols), enhancements to TETRA protocols need to be backward compatible so that legacy TETRA units can continue to work with units using enhanced TETRA protocols.

Accordingly, there is a need for a backward compatible method for enhancing TETRA protocols to increase the capacity of TETRA systems.

SUMMARY

Methods and systems for increasing calling capacity in a carrier are described. In one embodiment in the method a base station transmits to at least one mobile station a permission signal for transmission by the mobile station on one of a plurality of timeslots on a carrier. Each of the timeslots is divided into at least two sub-slots. The base station configures a control signal associated with each of the timeslots. Specific fields in the control signal are associated with each sub-slot on each of the timeslots. Usage markers are provided through the control signal. The usage markers values are divided into ranges, each range being used to identify a timeslot or a sub-slot assignment on the carrier. The base station sends a time advance value to the mobile station to indicate when transmission from the mobile station is to begin, thereby synchronizing transmissions on channels on the carrier from mobile stations in different geographical locations.

An embodiment of the base station contains various components that are configured to perform the method steps above.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
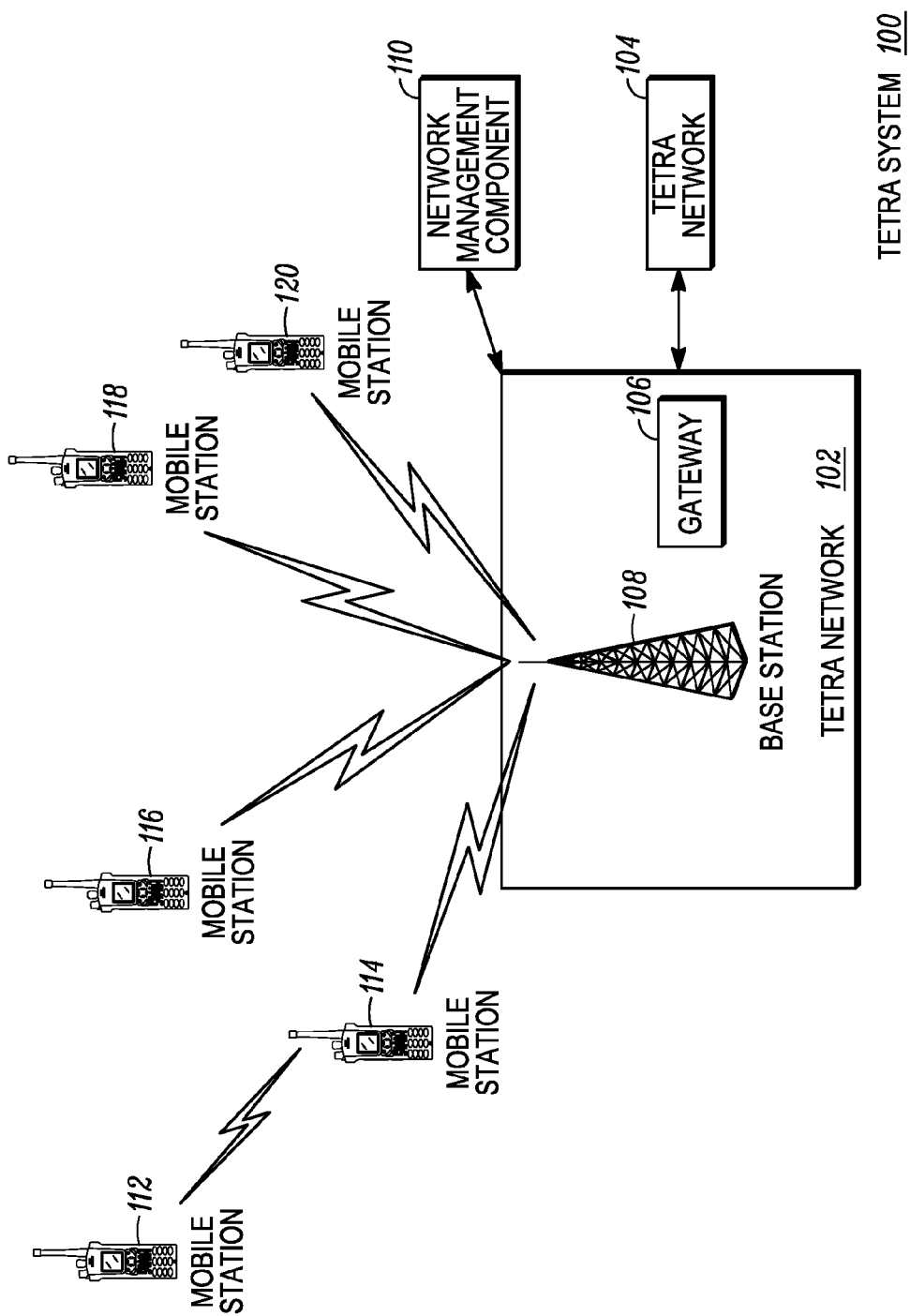
FIG. 1 is a block diagram of a Terrestrial Trunk Radio (TETRA) system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments are directed to providing apparatuses and methods for increasing calling capacity in a carrier using enhanced Terrestrial Trunk Radio (TETRA) protocols. A base station transmits, to at least one mobile station, a permission signal for transmission by the mobile station on one of a plurality of timeslots on a carrier. Each of the plurality of timeslots is divided into at least two sub-slots. The base station configures a control signal that is associated with each of the plurality of timeslots. Specific fields in the control signal are associated with each sub-slot on each of the plurality of timeslots. The base station provides, to the at least one mobile station, usage markers through the control signal. Usage markers values are divided into ranges. Each range is used to identify a timeslot or a sub-slot assignment on the carrier. The base station also sends a time advance value to the at least one mobile station to indicate when transmission from the mobile station is to begin, thereby synchronizing transmissions on channels on the carrier from mobile stations in different geographical locations.

FIG. 1 is a block diagram of a Terrestrial Trunk Radio (TETRA) system 100 used in accordance with some embodiments. System 100 includes one or more TETRA networks 102-104, each of which is connected to mobile stations. Each TETRA network 102-104 includes one or more base stations, for example base station 108, which is configured to relay voice/data traffic to and from associated mobile stations. Base stations in TETRA network 102-104 may also send and receive control/signaling streams to and from associated mobile stations. Each TETRA network 102-104 also includes a gateway, for example gateway 106, for connecting the TETRA networks to each other. Mobile stations 112-120 include professional/private radios, such as mobile radios and portable radios, which are configured to communicate directly with each other or through base station 108. System 100 also includes a network management component 110 which is configured to manage at least one TETRA network, for instance TETRA network 102. It should be appreciated by one skilled in the art that other components of TETRA networks 102-104 and system 100 are not shown in FIG. 1 for simplicity sake.

System 100 is referred to as an enhanced TETRA system in this document because it implements embodiments of enhanced TETRA protocols. In an embodiment, in system 100, four channels are interleaved into one carrier using Time Division Multiple Access (TDMA) protocol and a physical timeslot associated with each channel is divided into two sub-slots for processing two independent and simultaneous calls. Therefore, an embodiment of system 100 can support up to eight separate and simultaneous calls on each carrier. Although the discussion below is directed to dividing each timeslot into two sub-slots, other channel configurations are possible and are within the scope of this disclosure.

Figure 2:
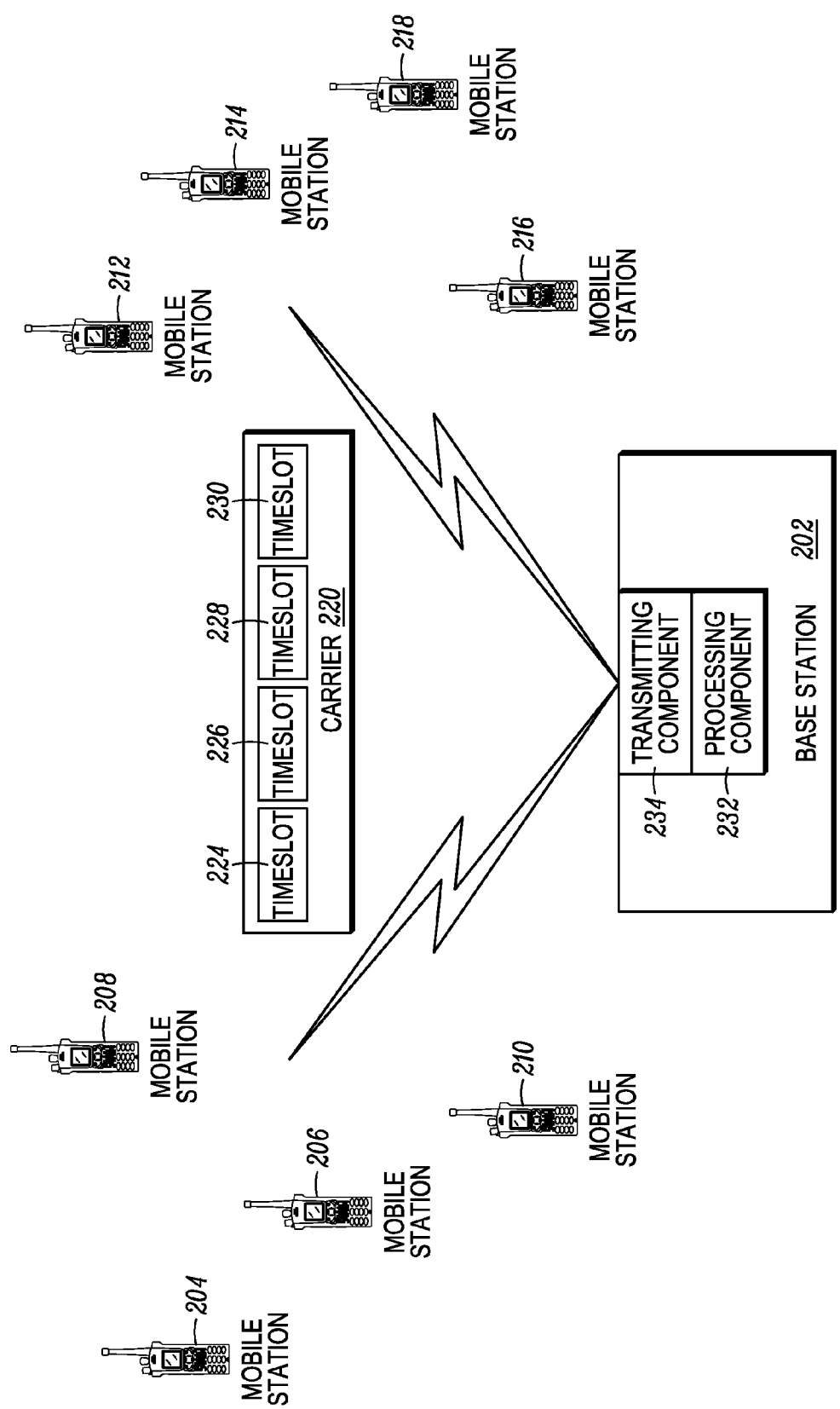
FIG. 2 is a block diagram of elements used in a TETRA in accordance with some embodiments.

FIG. 2 is a block diagram of elements used in a TETRA system in accordance with some embodiments. Base station 202 includes a transmitting component 234 which is configured to transmit and receive information from mobile stations 204-210 and 212-218 through timeslots 224-230 in a carrier 220. Each timeslots 224-230 in carrier 220 is divided into two sub-slots; thus enabling carrier 220 to support up to eight independent and simultaneous calls. By dividing each timeslots 224-230 into two sub-slots, the TETRA frame structure has eight sub-slots per TDMA frame. This is further organized as eighteen TDMA frames per multiframe. Voice/data traffic from an eighteen frame multiframe length of time is compressed and conveyed within seventeen TDMA frames, thus allowing the eighteenth frame to be used for control signaling without interrupting the flow of data.

Base station 202 also includes a processing component 232 which is configured to generate or configure parameters related to enhanced TETRA protocols. Base station 202 transmits these parameters to mobile stations 204-210 and 212-218 when each mobile station 204-210 and 212-218 switches to an assigned channel on carrier 220. In order to permit a mobile station to use a specific sub-slot, base station 202 transmits a permission signal to mobile stations 204-210 and 212-218 in a logical Main Control Channel (MCCH). The MCCH is common to all mobile stations (subscribers) in a cell.

For a voice call, the main parameters for allocating an uplink transmission channel are a carrier frequency and a timeslot (one out of four) or a sub-slot (one out of two in a timeslot). Base station 202 sends initial channel allocation assignments on the MCCH by specifically addressing each assignment to related groups of mobile stations or to an individual mobile station. If, for example, base station 202 uses two different carrier frequencies, when it grants a transmit permission to one or more mobile stations, it should direct the mobile station(s) to one of the two frequencies and a specific timeslot or sub-slot, which in some embodiments is one of two sub-slots on one of four timeslots. For example, base station 202 may direct a mobile station to the second frequency and the second sub-slot in timeslot 228. Once the mobile station is allocated to a circuit (frequency and sub-slot), the allocation holds for subsequent downlink and uplink transmissions, such that any subsequent transmissions between base station 202 and the mobile station is conducted according to the allocated carrier frequency and sub-slot. As a result, both voice/data traffic and control/signaling streams are transmitted in the allocated channel.

In particular, signaling streams are transmitted in a logical Assigned Control Channel (ACCH) and voice/data traffic is transmitted in a logical Traffic Channel (TCH) on the allocated frequency and timeslot covering the particular sub-slot. Once the addressed mobile station(s) physically switches to the allocated channel, base station 202 communicates with the addressed mobile station only using the ACCH and TCH on the allocated channel. The ACCH and TCH share the same physical resources, which are different than the physical resources used for MCCH.

In some embodiments, the signaling on the MCCH is unchanged so that legacy TETRA units (based stations and/or mobile stations configured to operate on one of four timeslots in a carrier) can operate on an enhanced TETRA system, such as system 100. To indicate the difference between legacy and enhanced circuits in messages transmitted over the MCCH, the messages include an indication that a circuit is either an enhanced circuit, or a legacy circuit.

Base station 202 provides the indication of an enhanced circuit in usage markers which are typically associated with downlink and/or uplink channels engaged with circuit mode services. In general, the usage markers are used to prevent crossed calls and for channel maintenance purposes. Base station 202 assigns a usage marker to each call before any traffic transmission takes place on an assigned channel. The assignment of the usage marker is conveyed in a Media Access Control (MAC)-RESOURCE packet data unit (PDU).

In some embodiments, on downlink slots, base station 202 sends an ACCESS-ASSIGN PDU which includes usage markers for each sub-slot on a channel. Base station 202 sends the ACCESS-ASSIGN PDU by using a logical Access Assignment Channel (AACH), which is mapped onto a broadcast block. The broadcast block is accessible to mobile stations on each sub-slot in a timeslot. The information in the ACCESS-ASSIGN PDU enables base station 202 to control and regulate usage of the physical resources, such as channels, shared by multiple users. In some circumstances, the information in the ACCESS-ASSIGN PDU also gives mobile stations 204-210 and 212-218 tools to conduct, maintain and verify services, even in uncertain conditions. For example, in a fade, a listening mobile station may lose several frames. When the listening mobile station recovers from the fade, the mobile station may verify that the call is still on by looking at the usage marker in the AACH.

In general, the ACCESS-ASSIGN PDU typically conveys information about a downlink channel and also conveys information about access rights for a corresponding uplink sub-slot. For example, the ACCESS-ASSIGN PDU may include information about a downlink sub-slot by identifying the type of usage marker on the proper field of the ACCESS-ASSIGN PDU. For instance, when voice traffic is being transmitted on a downlink sub-slot, the ACCESS-ASSIGN PDU includes a unique identifier—a traffic usage marker identifier (UMt)—for indicting that the downlink sub-slot is being used for voice traffic. The traffic usage marker is a 6 bit Media Access Control (MAC) label that base station 202 assigns to a call when setting-up a circuit mode call. When a downlink sub-slot is not assigned to a specific call or is not used for signaling, the ACCESS-ASSIGN PDU includes an unallocated usage marker (UMx) for indicting that the downlink sub-slot is unused. When a downlink sub-slot is allocated for control information designated to a specific mobile station, the ACCESS-ASSIGN PDU includes an assigned control usage marker identifier (UMa) for indicting that the downlink sub-slot is used for transmitting control information directed to a specific mobile station.

The value of each usage marker in the ACCESS-ASSIGN PDU identifies the type of usage on each sub-slot. In some embodiments, the value of the unallocated usage marker identifier (UMx) in an ACCESS-ASSIGN PDU is set to "000000" to indicate that the associated downlink sub-slot is not assigned to a specific call and it is not used for signaling. The value of the assigned control usage marker identifier (UMa) in the ACCESS-ASSIGN PDU is set to "000001" to indicate that the associated downlink/uplink sub-slots are allocated for control information designated to a specific mobile station. The value of common control usage marker (UMc) in the ACCESS-ASSIGN PDU is set to "000010" to indicate that the associated downlink/uplink sub-slots are allocated for common control information for multiple parties. Other values may be assigned to the traffic usage marker identifier (UMt) to indicate that the associated downlink and uplink sub-slots are allocated for voice traffic.

To further control and regulate usage of physical resources shared by multiple mobile stations 204-210 and 212-218, base station 202 may broadcast access rights in the ACCESS-ASSIGN PDU. By broadcasting access rights, base station 202 minimizes the possibility of message collisions from different mobile stations and avoids protocol instability at the media access control level. Common or assigned access rights are relevant whenever different mobile stations attempt to use the same uplink physical resources, thereby resulting in collisions. Base station 202 may grant/reserve access rights for uplink sub-slots to a specific mobile station. Alternatively, base station 202 may grant access rights for uplink sub-slots to multiple mobile stations by enforcing a policy for random uplink access in order to reduce the probability of collision.

As previously noted, in circuit mode, voice/data traffic from an eighteen frame multiframe length of time is compressed and conveyed within seventeen TDMA frames, thus allowing the eighteenth frame to be used for control signaling without interrupting the flow of data. The ACCESS-ASSIGN PDU in data packets in the seventeen TDMA frames typically includes two or more information header fields. The remaining bits are divided into access/usage marker fields, each of which is associated with a specific sub-slot on a channel and each of which includes vital information about a downlink or uplink frame. The bits are protected by means of a Reed Solomon Forward Error Correcting Code. It will be appreciated by one skilled in the art that other error protection schemes may also be used. The header fields include information that may be used to interpret the information in the access/usage marker fields, thereby implicitly indicating the channel status. It will be appreciated by one skilled in the art that the ACCESS-ASSIGN PDU may be configured in different ways and still be within the scope of this disclosure.

In some embodiments, usage markers are transmitted in the access/usage marker fields of the ACCESS-ASSIGN PDU. For example, a usage marker in a first access/usage marker field is associated with a first sub-slot in a channel and a usage marker in a second access/usage marker field is associated with a second sub-slot in the channel. The specific value of a traffic usage marker identifier (UMt) assigned to a circuit is used to distinguish between calls made according to legacy TETRA protocols and calls made according to enhanced TETRA protocols. In some embodiments, the traffic usage marker values are divided into two ranges. The first range begins from at a first allowed value for a UMt and ends at a predefined boundary. Traffic usage markers in the first range are used exclusively by base station 202 for legacy voice calls, that is, for assigning calls on one of four timeslots on a carrier. The second range begins one value from the predefined boundary and ends at the largest value, for example the sixth-fourth bit. Traffic usage markers in the second range are used exclusively by base station 202 for enhanced TETRA voice calls, that is for assigning calls on one of eight timeslots on a carrier. It should also be appreciated by one skilled in the art that the traffic usage marker values may be configured in different ranges or in different ways and still remain within the scope of this disclosure.

Accordingly, when base station 202 sets up an individual or group call, it assigns an appropriate traffic usage marker from one of these traffic usage marker ranges, depending on the type of call that is being setup. Legacy calls are allocated usage marker values from the first range while enhanced traffic calls are allocated usage marker values from the second range. Upon receiving the MCCH, a legacy mobile station, that is, a mobile station configured to operate on one of four timeslots on a carrier, processes the permission signaling from base station 202 according to the legacy TETRA protocols implemented by the mobile station. The legacy mobile station is unaware of the protocol enhancements. Whereas, upon receiving the MCCH, an enhanced mobile station, that is, a mobile station configured to operate on one of eight sub-slots on a carrier, processes the permission signaling from base station 202 according to the embodiments of the enhanced TETRA protocols implemented by the mobile station. The enhanced mobile station is thus able to identify the type of the call (legacy or enhanced) from the traffic usage marker value.

In addition to the traffic usage marker value, base station 202 transmits other parameters to enhanced mobile stations. One such additional parameter is a time advance value. In the uplink in TETRA systems, the timing of each mobile station 204-210 and 212-218 is based on its reception from base station 202. TETRA establishes a maximum service radius for a cell. TETRA also establishes a maximum ramp-up time and a maximum ramp-down time for a mobile station transmitting on a timeslot or a sub-slot. The ramp-up time is the time from the beginning of a transmission to a maximum/constant transmission power. The ramp down time is a time from a constant transmission power to when transmission ends. Based on the requirements of TETRA, if, for example, mobile station 204 is at the maximum possible distance from base station 202, there will be round trip delay of the radio signal from base station 202 to mobile station 204 and back to base station 202. The maximum value for this round trip delay is dictated by the standard to be seven (7) symbols.

To compensate for the round trip delay and prevent some of the ramp-down energy of mobile station 204 from leaking into the ramp-up energy of a mobile station that is closer to base station 202, embodiments of enhanced TETRA protocols provide a time advance value. By using the time advance value, mobile station 204 that is geographically located farther away from base station 202 starts its transmission earlier than, for example, mobile station 210 that is geographically located closer to base station 202. When mobile stations 204 and 210 are communicating with base station 202 in contiguous sub-slots in a channel, use of the time advance value enables base station 202 to receive transmissions from both mobile stations 204 and 210 at the same time. When using the time advance value, the number of symbols that can be packed into a half slot burst can be increased by seven (7), as the guard period needed at the end of the burst becomes unnecessary.

Once an enhanced mobile station knows that the circuit is allocated for an enhanced call, it will switch to the assigned channel (physically to the timeslot), without knowing the sub-slot assignment and any other information related to the enhanced call, such as the time advance value. Just after the channel assignment, the base station 202 starts transmitting the assigned traffic usage marker in the proper access/usage marker field dedicated for the allocated sub-slot. For example, if the first access/usage marker field of the ACCESS-ASSIGN PDU is assigned to the first sub-slot in a channel and the assigned traffic usage marker is found in the first access/usage marker field, the traffic usage marker will be used for the first sub-slot.

Figure 3:
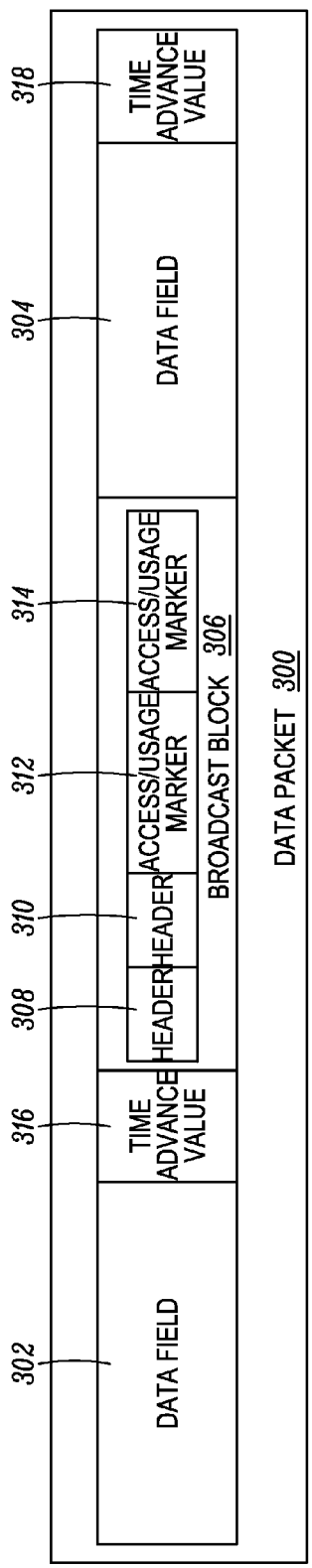
FIG. 3 is a block diagram of elements in a packet that form the content carried by a timeslot in accordance with some embodiments.

FIG. 3 is a block diagram of elements of a packet carried in a downlink timeslot in accordance with some embodiments. Data packet 300 includes data fields 302 and 304 and a broadcast block 306. Data field 302 is assigned to a first sub-slot and is used to transmit voice traffic or signaling streams for the first sub-slot. Data field 304 field is assigned to a second sub-slot and is used to transmit voice traffic or signaling streams for the second sub-slot. Broadcast block 306 is broadcast on the channel and it includes the ACCESS-ASSIGN PDU for the timeslot. The ACCESS-ASSIGN PDU is further divided into header fields 308 and 310 and access/usage marker fields 312 and 314. Header field 308 is associated with the first sub-slot and is used to describe the usage marker in access/usage marker field 312 which is also associated with the first sub-slot. Similarly, header field 310 is associated with the second sub-slot and is used to describe the usage marker in access/usage marker field 314 which is also associated with the second sub-slot. Access/usage marker fields 312 and 314 are used to transmit, for example, usage markers for the respective sub-slots.

In one embodiment, in eight to one multiplexing, the number of data symbols per sub-slot carried in the uplink is always less than the data symbols per sub-slot carried in the downlink. This is because uplink partitioning is physical and the downlink partitioning is logical. Physical partitioning always includes extra overhead for, for example, timing and channel response. According to some embodiments, there are ninety-nine data symbols per sub-slot in the uplink direction. On the other hand, there are one hundred and eight data symbols per sub-slot in the downlink direction. Accordingly, five bits of the unused symbols in data fields 302 and 304 in the downlink are used to carry the time advance value. In FIG. 3, the fields used to carry the time advance value are labeled as the time advance value 316 and 318. Other bits may be used to carry additional information for enhanced TETRA protocols. By transmitting the time advance value in unused downlink symbols, the time advance value may be updated during active transmissions.

In some embodiments, rather than transmitting the time advance value on each downlink transmission, because at least the first frame is free of any speech item, the capacity of the whole sub-slot is available to convey the five bit time advance value or any additional information. In these embodiments, a stealing mechanism may be applied, wherein data bits are taken from other fields in the data packet and used to transmit the time advance value.

Figure 4:
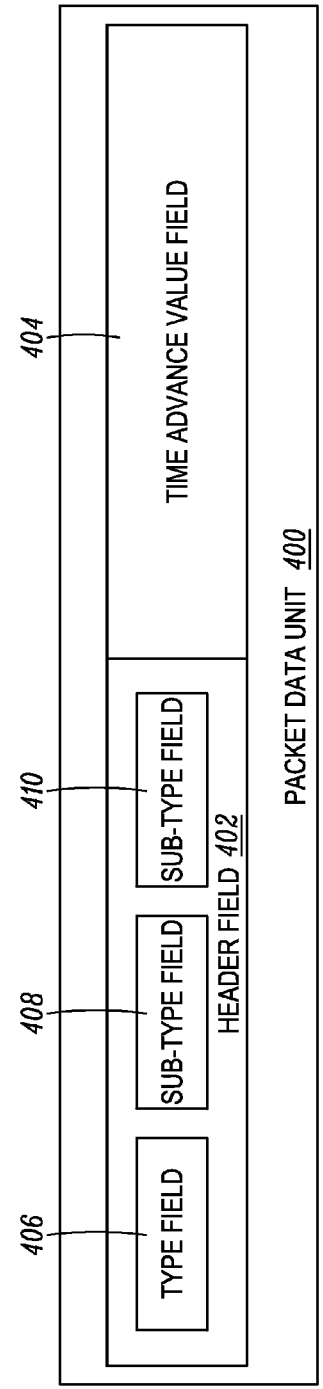
FIG. 4 is a block diagram of elements in a control data unit carried in a sub-slot in accordance with some embodiments.

FIG. 4 is a block diagram of elements of a control data unit for transmitting a time advance value in accordance with some embodiments. The control data unit 400 includes a header field 402 and a time advance value field 404. The header field 402 may be divided into a type field 406 and one or more sub-type fields 408-410. Type field 406 is a two bit field that is used to describe the type of the packet data unit. For example, type field 406 may describe control data unit 400 as a supplementary MAC packet data unit. Sub-type fields 408-410 are one bit each and are used to further describe the packet data unit. Time advance value field 404 is used to transmit the time advance value for a sub-slot. The control data unit 400 may be transmitted during an encoding process of a first speech item at a calling mobile station. It will be appreciated by one skilled in the art that the control data unit 400 may be configured in different ways and still remain within the scope of this disclosure.

In the embodiments described above, the information associated with the time advance value can be repeated over more than one frame. It should be noted that although the start of voice transmission is delayed by one frame (in case of repetition for few frames) the probability for any loss of speech items is very low because there is at least one frame gap between granting the sub-slot for a call and the availability of the first speech item at the calling mobile station side.

Figure 5:
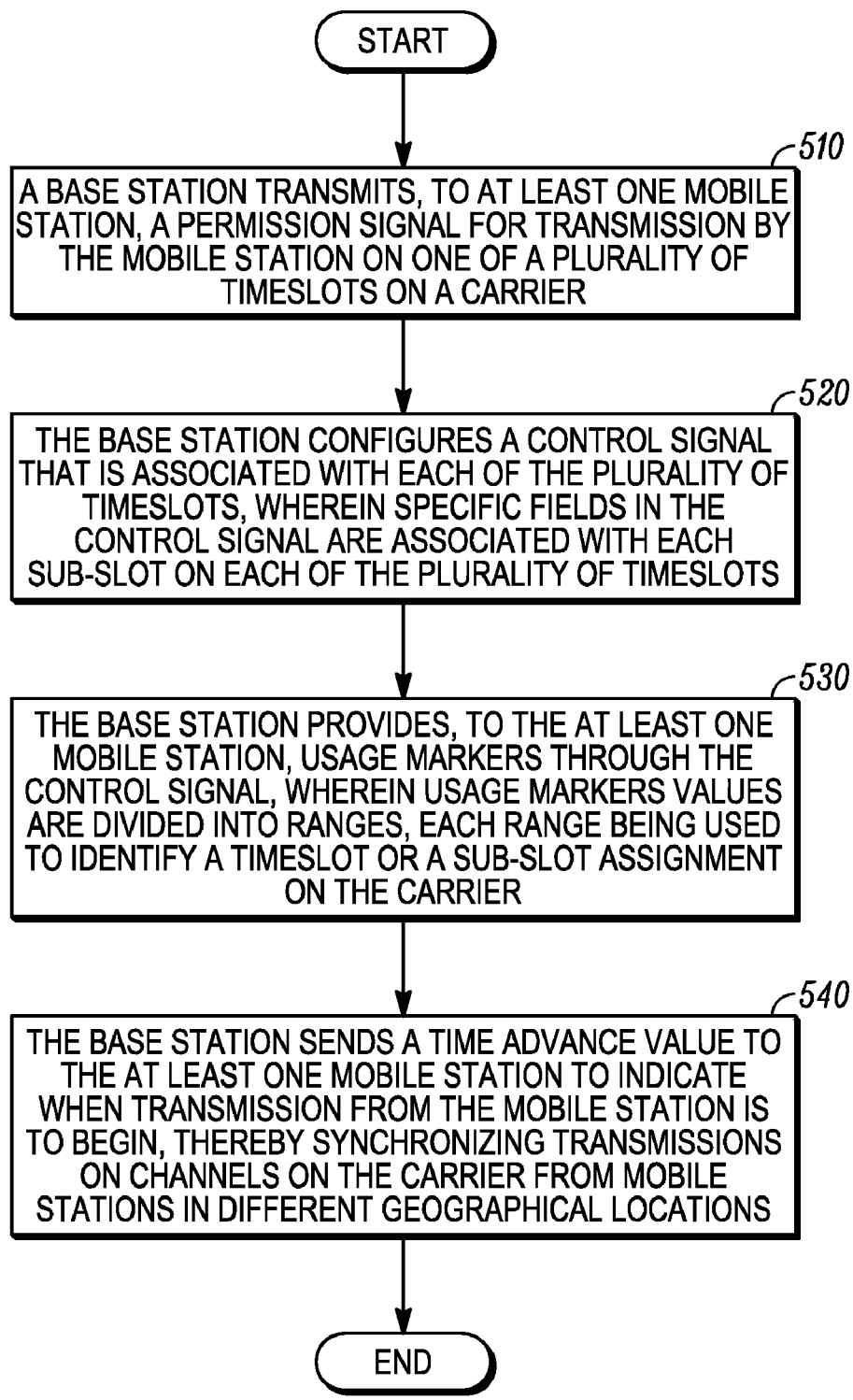
FIG. 5 is a flowchart of a method for implementing enhanced TETRA protocols in accordance with some embodiments.

FIG. 5 is a flowchart of a method for implementing enhanced TETRA protocols in accordance with some embodiments. In 510, a base station transmits, to at least one mobile station, a permission signal for transmission by the mobile station on one of a plurality of timeslots on a carrier. Each of the plurality of timeslots is divided into at least two sub-slots. In 520, the base station configures a control signal that is associated with each of the plurality of timeslots, wherein specific fields in the control signal are associated with each sub-slot on each of the plurality of timeslots. In 530, the base station provides, to the at least one mobile station, usage markers through the control signal. Usage markers values are divided into ranges, each range being used to identify a timeslot or a sub-slot assignment on the carrier. In 540, the base station sends a time advance value to the at least one mobile station to indicate when transmission from the mobile station is to begin, thereby synchronizing transmissions on channels on the carrier from mobile stations in different geographical locations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for increasing calling capacity in a carrier, the method comprising:
   transmitting, by a base station to at least one mobile station, a permission signal for transmission by the at least one mobile station on one of a plurality of timeslots on a carrier, wherein each of the plurality of timeslots is divided into at least two sub-slots;
   configuring, by the base station, a control signal that is associated with each of the plurality of timeslots, wherein specific fields in the control signal are associated with each sub-slot on each of the plurality of timeslots;
   providing usage markers through the control signal, by the base station to the at least one mobile station, wherein usage markers values are divided into ranges, each range used to identify a timeslot or a sub-slot assignment on the carrier; and
   sending, by the base station, a time advance value to the at least one mobile station to indicate when transmission from the mobile station is to begin, thereby synchronizing transmissions on channels on the carrier from mobile stations in different geographical locations.

2. The method of claim 1, wherein the configuring comprises configuring at least one header field for each sub-slot, wherein the header field provides information about an associated usage marker, the associated usage marker configured to convey information about the sub-slot.

3. The method of claim 1, wherein the configuring further comprises dividing values for the usage fields into two ranges.

4. The method of claim 3, wherein the configuring comprises configuring usage marker values in a first range to include predefined values and configuring usage marker values in a second range to include predefined values that are not included in the first range.

5. The method of claim 4, further comprising assigning, by the base station, a usage marker to each sub-slot before any transmissions take place on an assigned channel.

6. The method of claim 1, further comprising transmitting, by the base station, a broadcast block included a predefined number of fields, wherein specific fields in the broadcast block are associated with each sub-slot and wherein the broadcast block is accessible to all mobile stations assigned to a particular timeslot.

7. The method of claim 6, wherein the transmitting comprises transmitting the usage marker for each sub-slot in each of the plurality of timeslots in specific fields in the broadcast block that are associated with each sub-slot.

8. The method of claim 6, wherein the sending comprises sending the time advance values for each sub-slot in each of the plurality of timeslots in unused symbols in specific data fields in the broadcast block.

9. The method of claim 1, wherein the transmitting occurs when the at least one mobile station switches to an assigned channel.

10. The method of claim 1, wherein the transmitting comprises transmitting the permission signal in a logical main control channel.

11. The method of claim 1, wherein the sending comprises sending the time advance value in a supplementary packet data unit during an encoding process of a first speech item at a calling mobile station.

12. A base station configured to increase calling capacity in a carrier, the base station comprises:

a transmitting component configured to transmit, to at least one mobile station, a permission signal for transmission by the mobile station on one of a plurality of timeslots on a carrier, wherein each of the plurality of timeslots is divided into at least two sub-slots; and a processing component to configure a control signal that is associated with each of the plurality of timeslots, wherein specific fields in control signal are associated with each sub-slot on each of the plurality of timeslots;

wherein the transmitting component is configured to transmit, to the at least one mobile station, usage markers through the control signal, wherein usage marker values are divided into ranges, each range used to identify a timeslot or sub-slot assignment on the carrier, and wherein the transmitting component is further configured to transmit a time advance value to the at least one mobile station to indicate when transmission from the mobile station is to begin, thereby synchronizing transmissions on channels on the carrier from mobile stations in different geographical locations.

13. The base station of claim 12, wherein the processing component is configured to include at least one header field for each sub-slot in the control signal, wherein the header field provides information about an associated usage marker, the associated usage marker configured to convey information about the sub-slot.

14. The base station of claim 12, wherein the processing component is configured to divide values for the usage fields into two ranges.

15. The base station of claim 14, wherein the processing component is configured to generate usage marker values in a first range to include predefined values and usage marker values in a second range to include predefined values that are not included in the first range.

16. The base station of claim 12, wherein the processing component is further configured assign to a usage marker to each sub-slot before any transmissions take place on an assigned channel.

17. The base station of claim 12, wherein the transmitting component is configured transmit a broadcast block including a predefined number of fields, wherein each field in the broadcast block is associated with a specific sub-slot and wherein the broadcast block is accessible to all mobile stations assigned to a timeslot.

18. The base station of claim 17, wherein the transmitting component is configured to transmit the usage marker for each sub-slot in each of the plurality of timeslots in specific fields in the broadcast block that are associated with each sub-slot.

19. The base station of claim 17, wherein the transmitting component is configured to transmit the time advance value for each sub-slot in each of the plurality of timeslots in unused symbols in specific data fields in the broadcast block.

20. The base station of claim 12, wherein the transmitting component is configured to transmit the time advance value in a supplementary packet data unit during an encoding process of a first speech item at a calling mobile station.

* * * * *

UNITED STATES PATENT AND TRADEMARK OFFICE
CERTIFICATE OF CORRECTION

PATENT NO. : 8,306,573 B2  
APPLICATION NO. : 12/960522  
DATED : November 6, 2012  
INVENTOR(S) : Elmaleh et al.

Page 1 of 1

It is certified that error appears in the above-identified patent and that said Letters Patent is hereby corrected as shown below:

On the Title Page, item (75), under "Inventors", in Column 1, Line 1, delete "Makabim-Re'ut" and insert -- Modi'in-Maccabim-Re'ut --, therefor.

On the Title Page, item (75), under "Inventors", in Column 1, Line 2, delete "Tel Aviv-Yaffo" and insert -- Tel Aviv-Yafo --, therefor.

On the Title Page, item (75), under "Inventors", in Column 1, Line 4, delete "Gaash" and insert -- Ga'ash --, therefor.

In the Claims

In Column 12, Line 7, in Claim 16, delete "configured assign to" and insert -- configured to assign --, therefor.

In Column 12, Line 11, in Claim 17, delete "configured transmit" and insert -- configured to transmit --, therefor.

Signed and Sealed this  
Thirtieth Day of July, 2013

Teresa Stanek Rea  
*Acting Director of the United States Patent and Trademark Office*